(12) United States Patent
Sakurada (10) Patent No.: US 11,268,826 B2
(45) Date of Patent: Mar. 8, 2022

(54) ENVIRONMENTAL STATE ESTIMATION DEVICE, METHOD FOR ENVIRONMENTAL STATE ESTIMATION, AND ENVIRONMENTAL STATE ESTIMATION PROGRAM

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 16/573,366

(22) Filed: Sep. 17, 2019

(65) Prior Publication Data
US 2020/0149919 A1    May 14, 2020

(30) Foreign Application Priority Data
Nov. 14, 2018    (JP) .............................. JP2018-213883

(51) Int. Cl.
*G06K 9/00* (2006.01)
*G01C 21/36* (2006.01)
(Continued)

(52) U.S. Cl.
CPC ..... *G01C 21/3697* (2013.01); *G01C 21/3602* (2013.01); *G06K 9/00791* (2013.01);
(Continued)

(58) Field of Classification Search
CPC ............ G01C 21/3697; G01C 21/3602; G01C 21/3461; G06K 9/00791; G06K 9/6288;
(Continued)

(56) References Cited

U.S. PATENT DOCUMENTS 8,503,728 B2 * 8/2013 Takahashi .............. H04N 7/185
382/104
9,251,426 B2 * 2/2016 Hayakawa ......... G06K 9/00805
(Continued)

FOREIGN PATENT DOCUMENTS

JP    2012-216103 A    11/2012
JP    2016008024 A *    1/2016
(Continued)

*Primary Examiner* — Mahendra R Patel
(74) *Attorney, Agent, or Firm* — Oblon, McClelland, Maier & Neustadt, L.L.P.

(57) ABSTRACT

An environmental state estimation device according to one embodiment of the present disclosure includes an environmental state estimation unit configured to estimate an environmental state of a prescribed area, based on information regarding a surrounding environmental state acquired by a plurality of vehicles in the prescribed area. A method for environmental state estimation according to another embodiment of the present disclosure includes an estimation step of an environmental state estimation device estimating an environmental state of a prescribed area, based on information regarding a surrounding environmental state acquired by a plurality of vehicles in the prescribed area. An environmental state estimation program according to still another embodiment of the present disclosure causes an environmental state estimation device to execute an estimation step of estimating an environmental state of a prescribed area, based on information regarding a surrounding environmental state acquired by a plurality of vehicles in the prescribed area.

8 Claims, 5 Drawing Sheets

(51) Int. Cl.
*G06K 9/62* (2022.01)
*G06T 7/00* (2017.01)

(52) U.S. Cl.
CPC .......... *G06K 9/6288* (2013.01); *G06T 7/0002* (2013.01); *G06T 2207/30168* (2013.01); *G06T 2207/30252* (2013.01)

(58) Field of Classification Search
CPC ......... G06T 7/0002; G06T 2207/30252; G06T 2207/30168; B60W 40/00; B60W 40/06; B60W 50/00; B60W 2050/0031; B60W 2510/105; G08G 1/00; B60Q 9/00; B60Q 9/008; B60K 35/00; G01P 13/00; B60S 13/00; B60S 13/02; F02B 28/0406; F01B 29/083
USPC ....................................................... 382/103
See application file for complete search history.

(56) References Cited

U.S. PATENT DOCUMENTS

| | | | | | |
|---|---|---|---|---|---|
| 9,465,987 | B1* | 10/2016 | Bell | ................ | G06K 9/00798 |
| 10,252,461 | B2* | 4/2019 | Agrawal | ................. | G08G 1/20 |
| 11,021,171 | B2* | 6/2021 | Andres | ................. | B60W 50/14 |
| 11,062,341 | B2* | 7/2021 | Ramirez | ................. | G08G 1/012 |
| 2007/0263902 | A1* | 11/2007 | Higuchi | ............... | G05D 1/0246 |
| | | | | | 382/104 |
| 2008/0167819 | A1* | 7/2008 | Breed | ................... | G08G 1/161 |
| | | | | | 701/300 |
| 2008/0170754 | A1* | 7/2008 | Kawasaki | ......... | G06K 9/00805 |
| | | | | | 382/104 |
| 2010/0145570 | A1* | 6/2010 | Asahara | ................ | G08G 1/207 |
| | | | | | 701/31.4 |
| 2011/0052042 | A1* | 3/2011 | Ben Tzvi | ............. | G06T 19/006 |
| | | | | | 382/154 |
| 2012/0033851 | A1* | 2/2012 | Chen | .................... | G06T 7/0002 |
| | | | | | 382/100 |
| 2013/0173113 | A1* | 7/2013 | Takiguchi | ........... | B60K 26/021 |
| | | | | | 701/36 |
| 2014/0046503 | A1* | 2/2014 | Mulder | ................... | B62D 6/00 |
| | | | | | 701/1 |
| 2014/0142867 | A1* | 5/2014 | Shirakata | .............. | B60W 40/08 |
| | | | | | 702/33 |
| 2015/0006052 | A1* | 1/2015 | Sannodo | ......... | B60W 30/18109 |
| | | | | | 701/70 |
| 2015/0330807 | A1* | 11/2015 | Uno | ....................... | G01W 1/00 |
| | | | | | 701/41 |
| 2016/0267335 | A1* | 9/2016 | Hampiholi | ........... | B60K 28/066 |
| 2016/0305794 | A1* | 10/2016 | Horita | ................ | G06K 9/00825 |
| 2017/0015329 | A1* | 1/2017 | Furukawa | ............. | B60W 40/06 |
| 2017/0199045 | A1* | 7/2017 | George | ............. | G01C 21/3461 |
| 2018/0051990 | A1* | 2/2018 | Takeuchi | .............. | G01S 17/931 |
| 2018/0060676 | A1* | 3/2018 | Hartmann | .......... | G06K 9/00805 |
| 2019/0283773 | A1* | 9/2019 | Mori | ........................ | G06F 3/01 |
| 2020/0020226 | A1* | 1/2020 | Stenneth | ............. | G06K 9/00845 |
| 2020/0117204 | A1* | 4/2020 | Lindemann | ....... | B60W 60/0023 |
| 2020/0250854 | A1* | 8/2020 | Toyoshi | ................ | G06T 7/0002 |
| 2021/0309231 | A1* | 10/2021 | Fujita | ................. | G01C 21/3602 |

FOREIGN PATENT DOCUMENTS

| | | |
|---|---|---|
| JP | 2016-181061 A | 10/2016 |
| JP | 2017-24460 A | 2/2017 |
| JP | 2018158684 A | * 10/2018 |

* cited by examiner

ENVIRONMENTAL STATE ESTIMATION DEVICE, METHOD FOR ENVIRONMENTAL STATE ESTIMATION, AND ENVIRONMENTAL STATE ESTIMATION PROGRAM

INCORPORATION BY REFERENCE

The disclosure of Japanese Patent Application No. 2018-213883 filed on Nov. 14, 2018 including the specification, drawings and abstract is incorporated herein by reference in its entirety.

BACKGROUND

1. Technical Field

The present disclosure relates to environmental state estimation, and the like.

2. Description of Related Art

Techniques for estimating an environmental state surrounding a vehicle (for example, a rainfall state such as a rainfall amount, a flooding state such as the presence of flooding and the level of flooding, and a visibility state such as a visibility level and the presence of low visibility) have conventionally been known (see, for example, Japanese Patent Application Publication No. 2012-216103, Japanese Patent Application Publication No. 2017-024460, and Japanese Patent Application Publication No. 2016-181061).

SUMMARY

However, when an environmental state of an area where a vehicle is located is estimated based on information regarding a surrounding environmental state acquired by the vehicle, the accuracy of the estimation is dependent on the accuracy of the information acquired by the one vehicle. This may lead to deterioration in estimation accuracy.

Accordingly, in view of the problem, it is an object to provide an environmental state estimation device, and the like, capable of estimating the environmental state of a prescribed area with higher accuracy.

In order to accomplish the object, an environmental state estimation device is provided in one embodiment of the present disclosure. The environmental state estimation device includes an estimation unit configured to estimate an environmental state of a prescribed area, based on information regarding a surrounding environmental state acquired by a plurality of vehicles in the prescribed area.

According to the present embodiment, the information regarding the environmental state acquired by the vehicles in the same area is used. Accordingly, factors for accuracy deterioration, such as abnormal values, can be removed from the information corresponding to the vehicles, and the abnormal values can be equalized with the information corresponding to the vehicles. Hence, the environmental state estimation device can estimate the environmental state of the prescribed area with higher accuracy.

In the embodiment, the estimation unit may perform at least one of: estimating a rainfall state of the prescribed area, based on detection information from a rain sensor in each of the vehicles; estimating a flooding state of the prescribed area, based on information on wheel speed of a driving wheel and a driven wheel in each of the vehicles; and estimating a visibility state of the prescribed area, based on a surrounding image picked up by an imaging device in each of the vehicles.

According to the present embodiment, the environmental state estimation device can estimate at least one of the rainfall state, the flooding state, and the visibility state of a prescribed area, based on detection information from the rain sensor, information on the wheel speed of the driving wheel and the driven wheel, and a picked up surrounding image acquired in each of the vehicles, to be specific.

In the embodiment, the estimation unit may estimate the environmental state of the prescribed area by performing statistical processing for some or all of the vehicles, the statistical processing relating to first numerical values indicative of the environmental state surrounding the vehicles, the first numerical values being calculated based on the information regarding the environmental state surrounding the vehicles.

According to the present embodiment, the environmental state estimation device can perform the statistical processing relating to the first numerical values calculated from the information regarding the environmental state surrounding the vehicles, and can specifically estimate the environmental state.

In the embodiment, the environmental state estimation device may include a calculation unit configured to calculate the first numerical values indicative of the environmental state surrounding the vehicles based on the information regarding the environmental state surrounding the vehicles.

According to the present embodiment, the environmental state estimation device can autonomously calculate the first numerical values indicative of the environmental state surrounding the vehicles, based on the information regarding the environmental state surrounding the vehicles. This eliminates the necessity of performing, on the vehicle side, the processing of calculating a numerical value indicative of the environmental state surrounding the vehicle based on the information regarding the environmental state surrounding the vehicle, such as detection information from the sensors. As a result, the environmental state estimation device can reduce processing load on the vehicle side.

In the embodiment, the environmental state estimation device may include a selection unit configured to select, out of the vehicles, vehicles in a prescribed vehicle state, when the information regarding the environmental state surrounding the vehicles is acquired. The estimation unit may perform the statistical processing for the vehicles selected by the selection unit.

According to the present embodiment, the environmental state estimation device can exclude, from the prescribed vehicles, vehicles having a possibility of acquiring information regarding the environmental state with low accuracy, for example, and can select only the vehicles capable of acquiring the information regarding the environmental state having a certain level of accuracy. Therefore, the environmental state estimation device can estimate the environmental state of the prescribed area with further higher accuracy.

In the embodiment, the selection unit may select, out of the vehicles, vehicles not located in roofed places including tunnels, when the information regarding the environmental state surrounding the vehicles is acquired, and the estimation unit may estimate a rainfall state of the prescribed area by performing the statistical processing for the vehicles selected by the selection unit, the statistical processing relating to second numerical values indicative of the rainfall state surrounding the vehicles, the second numerical values being calculated based on the detection information from the rain sensor of the vehicles.

According to the present embodiment, the detection information from the rain sensor acquired in the vehicles located inside tunnels or other roofed places cannot reflect the rainfall state of the area at all. Accordingly, the environmental state estimation device can select only the vehicles not located inside tunnels, as the targets of the statistical processing for estimation of the rainfall state. Therefore, the environmental state estimation device can estimate the rainfall state of the prescribed area with further higher accuracy.

In the first embodiment, the selection unit may select, out of the vehicles, vehicles having the driven wheel, and the estimation unit may estimate the flooding state of the prescribed area by performing the statistical processing for the vehicles selected by the selection unit, the statistical processing relating to third numerical values corresponding to travel resistance of the driven wheel of the vehicles, the third numerical values being calculated based on the information on the wheel speed of the driving wheel and the driven wheel of the vehicles.

According to the present embodiment, the environmental state estimation device can estimate the flooding state of a prescribed area based on the travel resistance corresponding to a difference in wheel speed between the driving wheel and the driven wheel, for example. Hence, the environmental state estimation device can exclude the vehicles traveling with four-wheel drive (for example, part time four-wheel drive vehicles traveling with the four-wheel drive that is automatically or manually selected, or full time four-wheel drive vehicles traveling with permanent four-wheel drive) from the targets of the statistical processing. Therefore, the environmental state estimation device can estimate the flooding state of the prescribed area more appropriately.

In the embodiment, the selection unit may select, out of the vehicles, vehicles corresponding to picked up surrounding images having image recognition rates within a prescribed normal range in image recognition for recognizing a prescribed object from the images picked up by the imaging device of the vehicles, and the estimation unit may estimate the visibility state of the prescribed area by performing the statistical processing for the vehicles selected by the selection unit, the statistical processing relating to the image recognition rates as forth numerical values.

According to the present embodiment, the environmental state estimation device can estimate the visibility state of a prescribed area based on the image recognition rates regarding picked up surrounding images of the vehicles. Hence, the vehicles having image recognition rates that are not in the prescribed normal range can be excluded from the targets of the statistical processing. Therefore, the environmental state estimation device can estimate the visibility state of the prescribed area with further higher accuracy.

In the embodiment, the normal range may be defined as a range relatively lower than an average of the image recognition rates for the vehicles.

According to the present embodiment, in an area where visibility is good to some extent, the image recognition rates regarding picked up images surrounding the vehicles 10 can become relatively high. However, when a certain vehicle has frost, dew, or the like, formed on the front window or the like, or on the lens of the imaging device or the like, the images picked up by the imaging device include the frost, dew, or the like. As a result, the image recognition rate of the vehicle becomes relatively low. In such a case, the environmental state estimation device can specifically exclude such a vehicle from the targets of the statistical processing.

Other embodiments of the present disclosure are also applicable as a method for environmental state estimation and an environmental state estimation program.

The disclosed embodiments can provide an environmental state estimation device, and the like, capable of estimating the environmental state of a prescribed area with higher accuracy.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of the present disclosure will be described below with reference to the drawings.
Outline of Environmental State Estimation System First, the outline of an environmental state estimation system 1 according to the present embodiment will be described with reference to FIG. 1.

Figure 1:
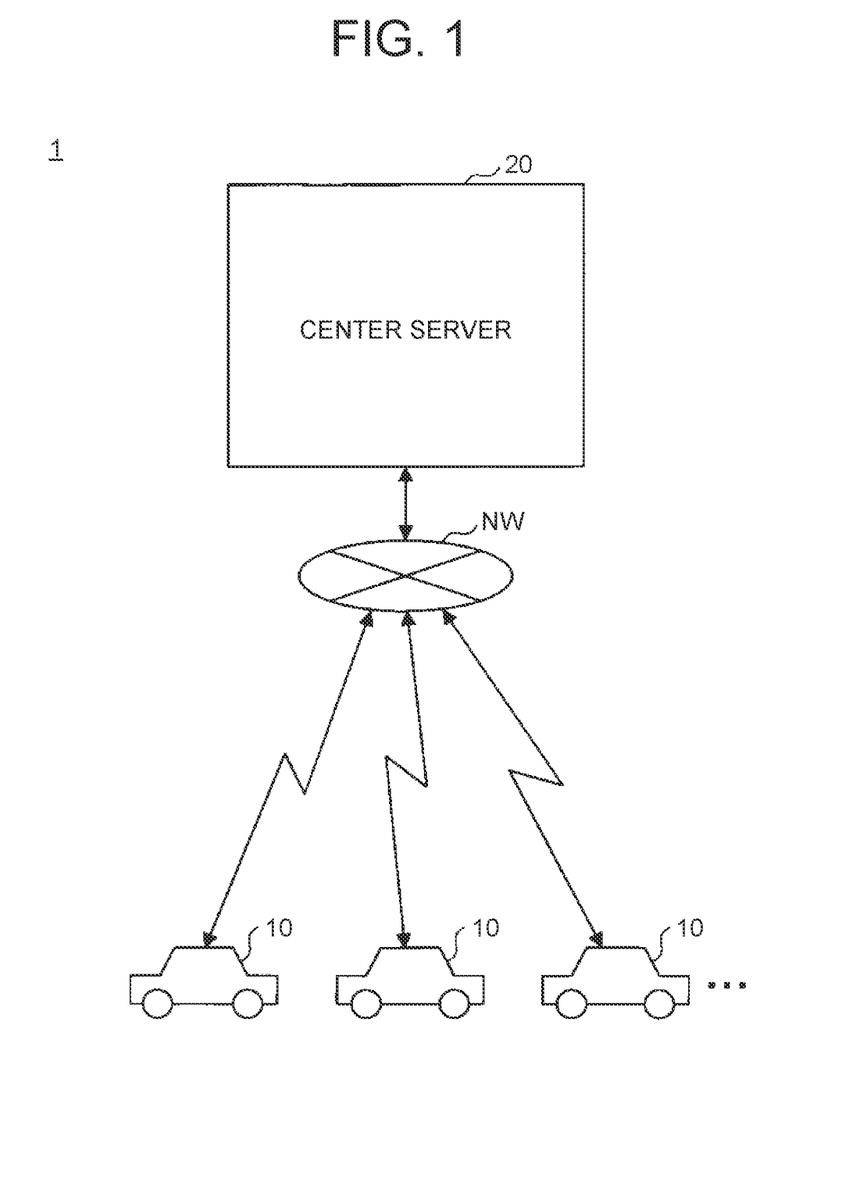
FIG. 1 is a schematic diagram showing an example of the configuration of an environmental state estimation system.

The environmental state estimation system 1 includes a plurality of vehicles 10 and a center server 20.

In the environmental state estimation system 1, the center server 20 estimates an environmental state in each of a plurality of predefined areas, based on information (hereinafter "environmental state related information") regarding an environmental state surrounding the vehicles 10 acquired by the vehicles. The environmental state related information includes, for example, information indicative of an environmental state surrounding the vehicles 10 that is acquired by various sensors mounted on the vehicles 10 (for example, ambient temperature information detected by an ambient temperature sensor, raindrop amount information detected by a rain sensor 14 described later, image information from a later-described camera 17 indicative of a visibility state surrounding the vehicles 10 described later, information regarding an image recognition rate for recognizing a prescribed object based on the image information from the camera 17) (hereinafter "first environmental state related information"). The environmental state related information includes detection information which varies due to the environmental state surrounding the vehicles 10, the detection information being acquired by the various sensors mounted on the vehicles 10 (for example, detection information from a later-described wheel speed sensor 15, the detection information corresponding to a driven wheel, the detection value of which becomes relatively lower when a road surface is flooded than when the road surface is not flooded) (hereinafter, "second environmental state related information"). The areas may be a plurality of rectangular areas formed by dividing a target area (hereinafter, "estimation target area") for environmental state estimation performed by the environmental state estimation system 1 into, for example, 500-meter-square areas in a grid pattern. As the estimation target area, a region across a plurality of countries, an entire country, a district across a plurality of prefectures or a plurality of states in one country, a prefecture, a state, a city, town, village, or the like, may optionally be set.

The vehicles 10 are communicably connected with the center server 20 through a communication network NW, which may include mobile object communication networks having base stations as terminals, satellite communication networks using communication satellites high up in the sky, and the Internet network, for example. The vehicles 10 upload (transmit) to the center server 20 information of a predefined type, the information regarding the vehicles 10 (hereinafter, "vehicle related information"), in response to an instruction from the center server 20, or in an automatic manner at a predefined timing. For example, the vehicle related information includes information (hereinafter, "vehicle state information") regarding various states of the vehicles 10, such as a location state, a motion state, a driver operation state, and a control state of the vehicles 10. The vehicle related information also includes, for example, information regarding an environmental state surrounding the vehicles 10, that is, the environmental state related information, such as ambient temperature surrounding the vehicles 10.

The center server 20 (an example of the environmental state estimation device) is communicably connected with each of the vehicles 10 through the communication network NW. The center server 20 receives the vehicle related information transmitted from each of the vehicles 10, and estimates the environmental state in each of the areas included in an estimation target area based on the vehicle related information as described above.

Configure of Environmental Sate Estimation System

Next, the configuration of the environmental state estimation system will be described with reference to FIG. 2 (FIGS. 2A, 2B) and FIG. 3 in addition to FIG. 1.

Figure 2A:
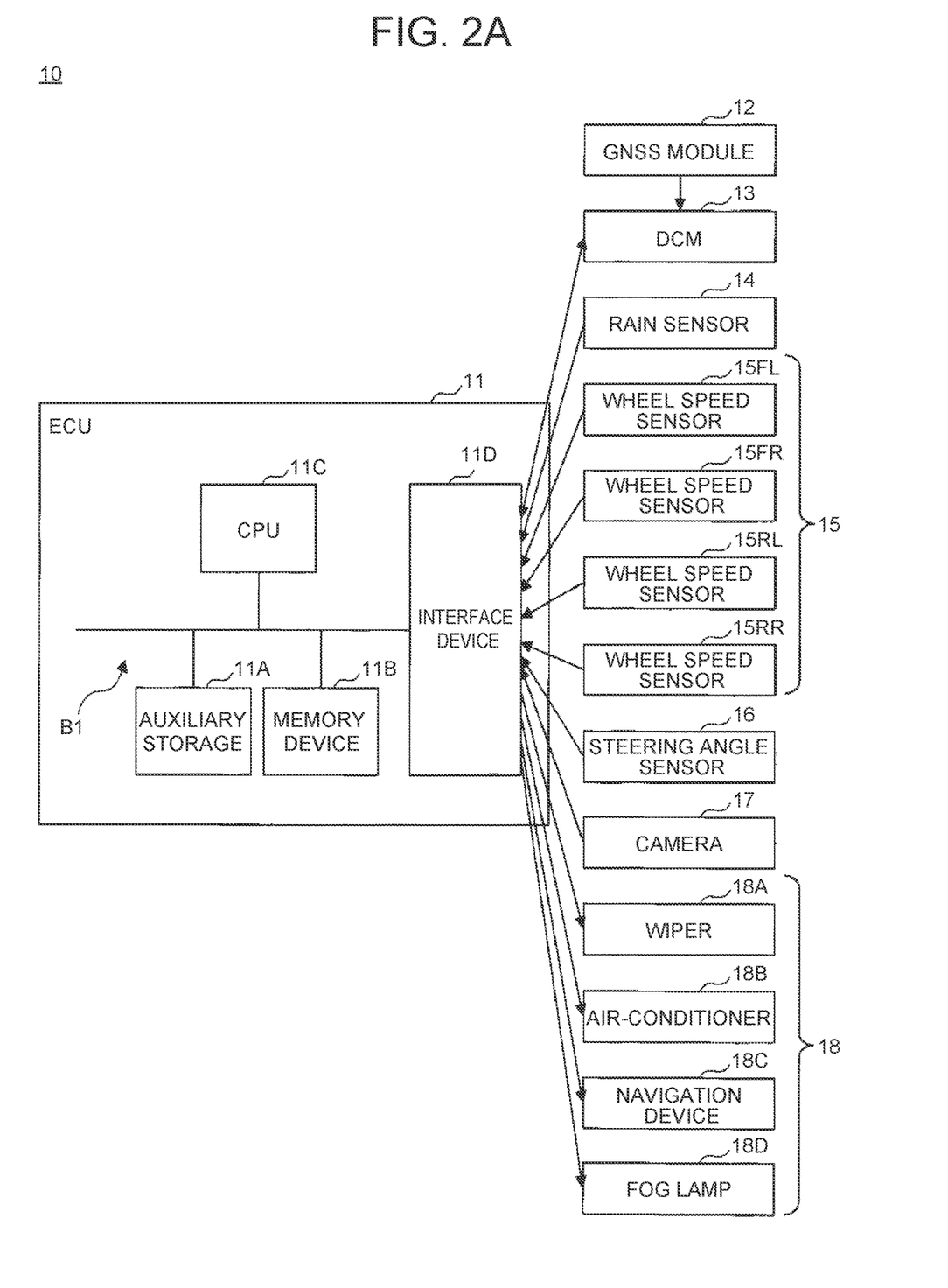
FIG. 2A illustrates an example of the hardware configuration of a vehicle.
Figure 2B:
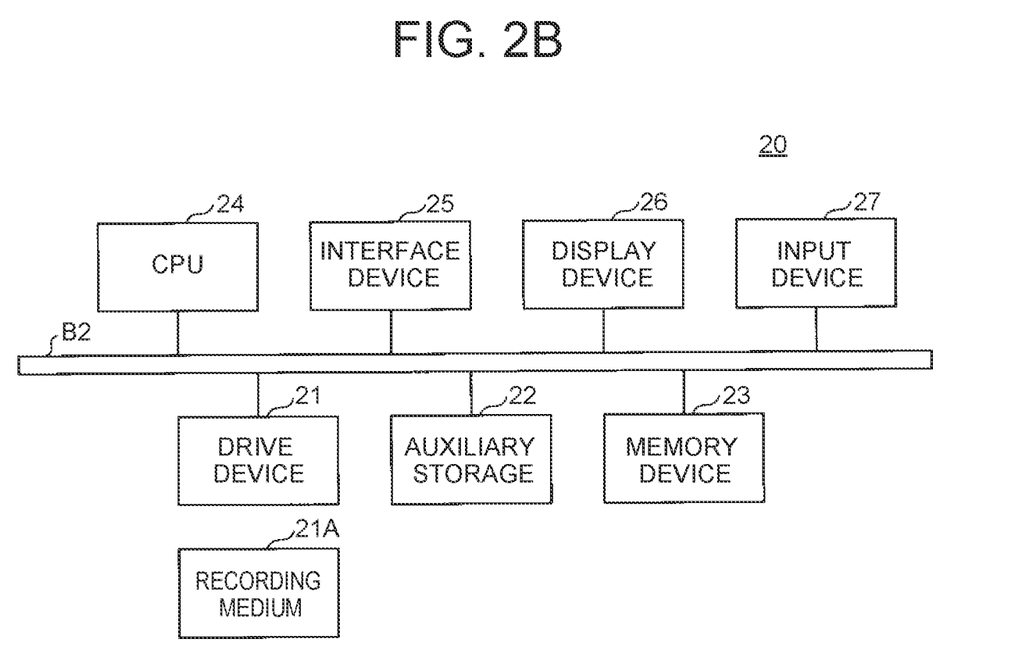
FIG. 2B illustrates an example of the hardware configuration of a center server.

FIG. 2 shows an example of the hardware configuration of the environmental state estimation system 1. Specifically, FIG. 2A shows an example of the hardware configuration of the vehicle 10, and FIG. 2B shows an example of the hardware configuration of the center server 20. FIG. 3 shows an example of the functional configuration of the environmental state estimation system 1.

Vehicle Configuration

As shown in FIG. 2, the vehicle 10 includes an electronic control unit (ECU) 11, a global navigation satellite system (GNSS) module 12, a data communication module (DCM) 13, a rain sensor 14, a wheel speed sensor 15, a steering angle sensor 16, a camera 17, and an on-board device 18.

The ECU 11 is an electronic control unit which performs control for various functions of the vehicles. The functions of the ECU 11 may be implemented by any hardware, or by a combination of hardware and software. For example, the ECU 11 may be mainly configured with a microcomputer including components, such as an auxiliary storage 11A, a memory device 11B, a central processing unit (CPU) 11C, and an interface device 11D, which are connected with each other through a bus B1.

Programs which implement various functions of the ECU 11 are provided by a dedicated tool which is connected to a prescribed connector (for example, data link coupler (DLC)) connected with, for example, an on-board network of the vehicle 10, such as a controller area network (CAN), through a cable. In response to a prescribed operation performed in the dedicated tool, the programs are installed in the auxiliary storage 11A of the ECU 11 from the dedicated tool through the cable, the connector, and the on-board network. The programs may also be downloaded from another computer (for example, center server 20) through the communication network NW, and be installed in the auxiliary storage 11A.

The auxiliary storage 11A stores the installed programs, and also stores required files, data, and the like. For example, the auxiliary storage 11A is a hard disk drive (HDD), a flash memory, or the like.

The memory device 11B reads and stores the programs from the auxiliary storage 11A, when there is a program start instruction.

The CPU 11C executes the programs stored in the memory device 11B, and implements various functions of the ECU 11 in accordance with the programs.

The interface device 11D is used as an interface for establishing a connection with the on-board network or a one-to-one connection with various sensors, an actuator, or the like, for example. The interface device 11D may include a plurality of different types of interface devices depending on connection destinations.

The GNSS module 12 positions the location of the vehicle 10 which incorporates the GNSS module 12 by receiving satellite signals transmitted from three or more satellites, and preferably four or more satellites over the vehicle 10. The positioning information from the GNSS module 12, i.e., the information on the location of the vehicle 10, is taken into the ECU 11.

The DCM 13 is an example of a communicating device which establishes a connection with the communication network NW and communicates with external devices including the center server 20 through the communication network NW. The DCM 13 exchanges various signals (for example, information signal, control signal, and the like) with the center servers 20. For example, the DCM 13 is communicably connected with the ECU 11 through the on-board network to transmit various signals to the outside, or to output signals received from the outside to the ECU 11 through the on-board network, in response to a request from the ECU 11.

The rain sensor 14 is a known detector which detects the presence of a raindrop in a prescribed detection area which is provided on the front window of the vehicle 10, and also detects a raindrop amount, for example. Detection information corresponding to the raindrop amount detected by the rain sensor 14 is taken into the ECU 11 through a one-to-one communication line, an on-board network, or the like.

The wheel speed sensor 15 is a known detector which detects the wheel speed of four wheels of the vehicle 10. The wheel speed sensor 15 includes wheel speed sensors 15FL, 15FR, 15RL, 15RR which detect the wheel speed of a forward left wheel, a forward right wheel, a rear left wheel, and a rear right wheel of the vehicle 10, respectively. The detection information corresponding to the wheel speed of four wheels detected by the wheel speed sensor 15 (15FL, 15FR, 15RL, 15RR) is taken into the ECU 11 through the one-to-one communication line, the on-board network, or the like.

The steering angle sensor 16 is a known detector which detects a steering angle in the steering device of the vehicle 10. Detection information corresponding to the steering angle detected by the steering angle sensor 16 is taken into the ECU 11 through the one-to-one communication line, the on-board network, or the like.

For example, the camera 17 is attached in the vicinity of the center of a front header in the vehicle cabin of the vehicle in order to image the front side of the vehicle 10 from the inside of the vehicle cabin through the front window. The camera 17 images the front side of the vehicle 10 in every imaging period (for example, 1/30 seconds) from startup to stop of the vehicle 10.

The camera 17 may be attached outside the vehicle cabin. The startup and stop of the vehicle 10 refers to transition of the vehicle 10 from an untravelable state to a travelable state, and transition of the vehicle 10 from the travelable state to the untravelable state, respectively. The startup and stop of the vehicle 10 include, for example, engine start and engine stop in the case where the vehicle 10 uses only an engine as a power source, and start and stop of electric power supply, from a high voltage battery used as an electric power source for driving of the vehicle 10, to an electric motor in the case where the vehicle 10 is driven by the electric motor, respectively.

The on-board device 18 includes a wiper 18A, an air-conditioner 18B, a navigation device 18C, and a fog lamp 18D.

The wiper 18A is a known device for wiping away waterdrops adhering to the front window in case of rainy weather and the like. In the case of a manual mode, operation and stop of the wiper 18A is switched or the operation speed of the wiper 18A is switched in response to the operation performed on a wiper switch by a user, for example. In the case of an automatic mode, operation and stop of the wiper 18A is switched or the operation speed of the wiper 18A is switched in accordance with the detection information corresponding to the raindrop amount detected by the rain sensor 14, for example. In the case of the automatic mode, operation and stop of the wiper 18A may also be switched or the operation speed of the wiper 18A may be switched under control of the ECU 11, for example.

The air-conditioner 18B is a known device for regulating the temperature and humidity in the vehicle cabin of the vehicle 10. For example, the air-conditioner 18B includes: a refrigeration cycle constituted of a compressor driven with an engine or an electric motor, a condenser, an evaporator, and a vapor-liquid separator; a heater core using heat of a coolant which passed the engine, electric heat, or the like; a temperature control mechanism which mixes the air passing the evaporator with the air passing the heater core to regulate the temperature; and a blowout port switching mechanism which switches a blowout port of air blown to the vehicle cabin. The air-conditioner 18B also includes a defogger function for at least one of a front window and a rear window.

The navigation device 18C is a known route navigator for navigating a route from a prescribed place of departure to a prescribed destination, while displaying map information on a display that is provided at a position easily visually recognizable by an occupant such as a driver in the vehicle cabin of the vehicle 10. In this case, the prescribed place of departure may be the current location of the vehicle 10, or may be a place of departure set by the user of the vehicle 10, other than the current location. The prescribed destination may be a destination set by a user (for example, a driver, a passenger, or the like) of the vehicle 10, or may be a destination automatically proposed based on, for example, a past movement history of the user, or the like. The navigation device 18C may also be configured to perform route search as a preparation of the route navigation by itself, or a prescribed external device (for example, a navigation server for route search, or the like) connected through the communication network NW may be configured to execute the route search and distribute the search result to the navigation device 18C of the vehicle 10.

The fog lamp 18D is an auxiliary light instrument for enhancing the conspicuity of the vehicle 10 at the time of low visibility. The fog lamp 18D includes at least one of a front fog lamp and a rear fog lamp. The front fog lamp includes the function to enhance the conspicuity of the vehicle 10 as well as the function to secure front visibility.

Figure 3:
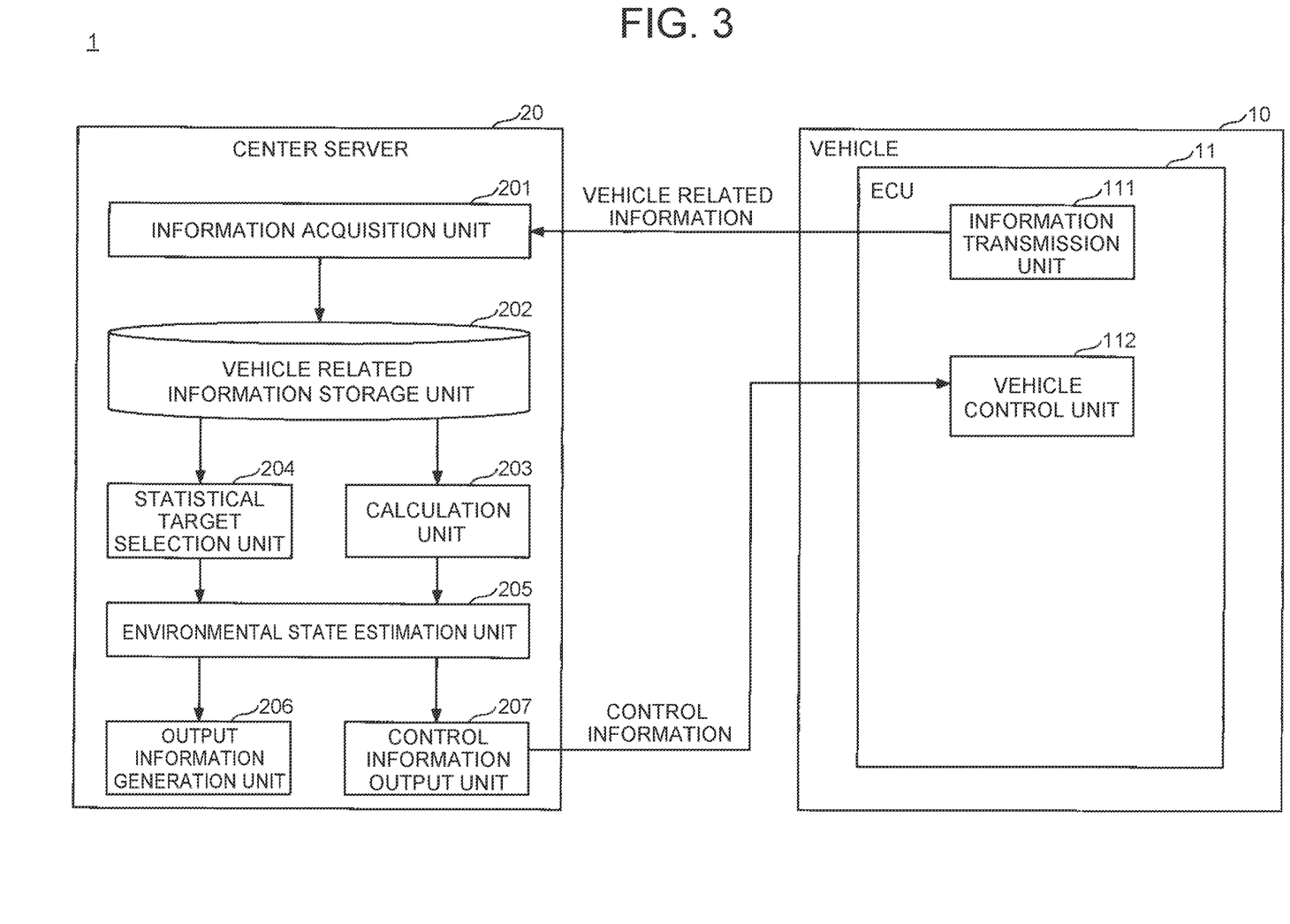
FIG. 3 shows an example of the functional configuration of the environmental state estimation system.

As shown in FIG. 3, the ECU 11 includes an information transmission unit 111 and a vehicle control unit 112 as functional units implemented by, for example, executing one or more programs stored in the auxiliary storage 11A on the CPU 11C.

The information transmission unit 111 acquires the aforementioned vehicle related information at a specified period (for example, one minute), and transmits the information to the center server 20, for example. Specifically, the information transmission unit 111 may transmit a signal to the center server 20. The signal includes: identification information which identifies the vehicle 10 as a transmission source (for example, a vehicle index number (VIN) of the vehicle 10, a vehicle identifier (ID) predefined for each of the vehicles 10, or the like) (hereinafter, "vehicle identification information"); information regarding date and time of acquisition of the vehicle related information (for example, time stamp) (hereinafter, "acquisition time information"); and the vehicle related information. Thus, the center server 20 can identify (specify) the vehicle 10 that is a transmission source, or identify the acquisition time, or the like, of the vehicle related information.

The vehicle control unit 112 performs control for the vehicle 10 in response to a control instruction from the center server 20. The details thereof will be described later.

Configuration of Center Server

The functions of the center server 20 may be implemented by any hardware, or by a combination of hardware and software. As shown in FIG. 2B, the center server 20 includes, for example, a drive device 21, an auxiliary storage 22, a memory device 23, a CPU 24, an interface device 25, a display device 26, and an input device 27. These devices are connected through a bus B2.

Programs which implement various functions of the center server 20 are provided by a recording medium 21A, for example. When the recording medium 21A programs are recorded in are set in the drive device 21, the programs are installed in the auxiliary storage 22 from the recording medium 21A through the drive device 21. The programs may also be downloaded from another computer through the communication network, and be installed in the auxiliary storage 22.

The auxiliary storage 22 stores the installed various programs, and also stores required files, data, and the like.

The memory device 23 reads and stores the programs from the auxiliary storage 22, when there is a program start instruction.

The CPU 24 executes the various programs stored in the memory device 23, and implements the various functions of the center server 20 in accordance with the programs.

The interface device 25 is used as an interface for establishing a connection with a communication network (for example, the communication network NW).

The display device 26 displays, for example, a GUI in accordance with a program executed in the CPU 24.

The input device 27 is used by users such as an operator and an administrator of the center server 20 to input various operation instructions with respect to the center server 20.

As shown in FIG. 3, the center server 20 includes, as a functional unit implemented by, for example, executing one or more programs stored in the auxiliary storage 22 on the CPU 24, an information acquisition unit 201, a calculation unit 203, a statistical target selection unit 204, an environmental state estimation unit 205, an output information generation unit 206, and a control information output unit 207. The center server 20 also uses a vehicle related information storage unit 202, and the like. The vehicle related information storage unit 202 can be implemented by using, for example, the auxiliary storage 22, or an external storage or the like, which is communicably connected with the center server 20.

The information acquisition unit 201 acquires the vehicle related information received from each of the vehicles 10, and stores (accumulates) the received information in the vehicle related information storage unit 202. Specifically, the information acquisition unit 201 stores in the vehicle related information storage unit 202 the vehicle related information received from the vehicles 10 as records associated with corresponding vehicle identification information and date and time of acquisition information.

As described above, the vehicle related information storage unit 202 stores the vehicle related information received from the vehicles 10. Specifically, the vehicle related information storage unit 202 holds a record including the vehicle identification information, the acquisition time information, and the vehicle related information, and so the vehicle related information storage unit 202 may hold a record group (i.e., database) including the vehicle related information acquired in the vehicles 10. The vehicle related information storage unit 202 may have vehicle related information storage sub-units dedicated for the respective vehicles 10. The vehicle related information storage sub-units may hold record histories including the acquisition time information and the vehicle related information, i.e., record groups for the respective vehicles 10.

The calculation unit 203 calculates, based on the information related to the environmental state surrounding the vehicles 10, first numerical values (hereinafter, "environmental state values") indicative of the environmental state surrounding the vehicles 10 to be estimated. For example, the calculation unit 203 calculates environmental state values of all the vehicles 10, the environmental state values corresponding to the environmental state surrounding the vehicles 10. When the statistical target selection unit 204 can select, out of the vehicles 10, vehicles 10 as the targets of statistical processing performed by the environmental state estimation unit 205 irrespective of the calculation result in the calculation unit 203, the calculation unit 203 may calculate the environmental state values for the vehicles 10 selected in advance by the statistical target selection unit 204, out of the vehicles 10, the environmental state values corresponding to the environmental state surrounding the vehicles 10. The details thereof will be described later.

The statistical target selection unit 204 (an example of the selection unit) selects, out of the vehicles 10, vehicles 10 as the targets of the statistical processing performed by the environmental state estimation unit 205. In other words, the statistical target selection unit 204 filters vehicles 10, unsuitable as the targets of the statistical processing performed by the environmental state estimation unit 205, out of the vehicles 10. Specifically, the statistical target selection unit 204 selects, out of the vehicles 10, vehicles 10 in a prescribed vehicle state suitable as the targets of the statistical processing when the vehicle related information, including the environmental state related information that is used for environmental state estimation, is acquired in the vehicles 10. The details thereof will be described later.

The environmental state estimation unit 205 (an example of the estimation unit) estimates, for each of a plurality of areas defined in the aforementioned estimation target area, an environmental state of a corresponding area based on the environmental state related information acquired in two or more vehicles 10, out of the vehicles 10, present in the corresponding area. Specifically, based on the latest environmental state related information acquired by two or more vehicles 10, out of the vehicles 10, present in the corresponding area and received in the center server 20, the environmental state estimation unit 205 may estimate, for each corresponding area, the latest (one minutes before, or the like) or the current environmental state in the corresponding area.

For example, the environmental state estimation unit 205 estimates, for each of the areas, the environmental state of a corresponding area by performing statistical processing (such as processing to calculate an average) relating to environmental state values calculated by the calculation unit 203, the environmental state values corresponding to all the vehicles 10 present in the corresponding area (hereinafter, simply referred to as "vehicles 10 present in the area", or the like), when the latest vehicle related information is received and acquired. In other words, the environmental state estimation unit 205 calculates the estimate of the environmental state value (hereinafter, "environmental state estimate") of the corresponding area. The environmental state estimation unit 205 may also calculate, for each of the areas, the environmental state estimate of a corresponding area by performing statistical processing relating to environmental state values calculated by the calculation unit 203, the environmental state values corresponding to the vehicles 10 selected by the statistical target selection unit 204, out of the vehicles 10 present in the corresponding area. When in a certain area, the number of the vehicles 10 as the targets of the statistical processing is equal to or less than a specified number (for example, five), the environmental state estimation unit 205 may determine that estimation of the environmental state of the target area is not possible. This is because the estimation accuracy of the environmental state may possibly be deteriorated when the number of the vehicles 10 as the targets of the statistical processing becomes relatively small. The details thereof will be described later.

The output information generation unit 206 generates information indicative of the environmental state estimated by the environmental state estimation unit 205 (hereinafter, "output information") in a prescribed format for each of the areas. For example, the output information generated by the output information generation unit 206 may be displayed on the display device 26 in response to an operation performed on the input device 27, or in an automatic manner, or may be transmitted to a prescribed external device, or the like, connected through a communication network (for example, communication network NW). The details of the output information will be described later.

Based on the environmental state of any area estimated by the environmental state estimation unit 205, the control information output unit 207 outputs (transmits) control information regarding the vehicles 10 present in the area to the vehicles 10. The control information defines a control mode of the vehicles 10. The details of the control information will be described later.

Specific Example of Method for Environmental State Estimation

A specific description is now given of a method for environmental state estimation by the environmental state estimation system 1, while illustrating specific environmental states to be estimated, continuously with reference to FIG. 3.

In the following description, a rainfall state, a flooding state, and a visibility state are illustrated as the specific environmental states to be estimated. However, the environmental state estimation system 1 according to the present embodiment may estimate the environmental state of other kinds (for example, a temperature state, or the like, for each of a plurality of areas which may be estimated based on the detection information from an ambient temperature sensor mounted on each of the vehicles 10). The environmental state estimation system 1 according to the present embodiment does not need to estimate all the states including the rainfall state, the flooding state, and the visibility state, as the specific environmental states to be estimated. Rather, the environmental state estimation system 1 may be configured to estimate at least one of these states.

Method for Rainfall State Estimation

First, description is given of an example of the method for estimation of the rainfall state estimation (for example, the presence of rainfall, the amount of rainfall, or the like) by the environmental state estimation system.

In the present example, the information transmission unit 111 of the vehicle 10 transmits the vehicle related information to the center server 20 at a specified period. In this case, the vehicle related information to be transmitted includes detection information from the rain sensor 14 as the environmental state related information (first environmental state related information to be specific) of the vehicle 10, information regarding an operation state of the wiper 18A (hereinafter, "wiper operation state information"), detection information from the wheel speed sensor 15 or information on vehicle speed of the vehicle 10 based on the detection information from the wheel speed sensor 15, and information on the location of the vehicle 10. The wiper operation state information may include information regarding the presence of operation of the wiper 18A, and information regarding an operation period at the time of operation.

The calculation unit 203 of the center server 20 calculates, for each of the vehicles 10 or for each of the vehicles 10 selected by the statistical target selection unit 204, a rainfall amount δ per unit volume (for example, 1 m³) as an environmental state value indicative of the rainfall state, based on the detection information from the rain sensor 14 as the latest environmental state related information received in the center server 20, the environmental state related information being stored in the vehicle related information storage unit 202.

The function of the calculation unit 203 in the present embodiment may be transferred to each of the vehicles 10. In that case, the ECU 11 in each of the vehicles 10 calculates the rainfall amount δ based on the detection information from the rain sensor 14, and transmits the vehicle related information including the calculated rainfall amount δ to the center server 20.

For example, the calculation unit 203 calculates the rainfall amount δ per unit volume based on the detection information from the rain sensor 14, the information on vehicle speed of the vehicle 10, and the wiper operation state information.

Specifically, the rainfall amount δ is expressed by a following expression (1), based on size (hereinafter, "detection area size") A of a raindrop detection area of the rain sensor 14, a raindrop detection amount D by the rain sensor 14, a vehicle speed v of the vehicle 10, and an operation period (hereinafter, "wiper period") t of the wiper 18A.

$$\delta = D/A \cdot v \cdot t \quad (1)$$

Here, used as the raindrop detection amount D by the rain sensor 14 is a value obtained by applying zero point correction by a following expression (2) using an output value d of the rain sensor 14, and an output value (i.e., zero point value) d0 of the rain sensor 14 under the condition of no raindrop.

$$D = d - d0 \quad (2)$$

The calculation unit 203 may calculate an environmental state value indicative of the rainfall state in another form. For example, the calculation unit 203 may simply divide the raindrop detection amount D from the rain sensor 14 by the detection area size A and the wiper period t to calculate the rainfall amount per unit time (for example, one minute) and per unit area (for example, 1 m²) as the environmental state value indicative of the rainfall state.

The statistical target selection unit 204 of the center server 20 selects, out of the vehicles 10, vehicles 10 as the targets of statistical processing performed by the environmental state estimation unit 205 as described above. In other words, the statistical target selection unit 204 may select the vehicles 10 as the target of the statistical processing performed by the environmental state estimation unit 205 by excluding vehicles 10 unsuitable as the targets of the statistical processing from the vehicles 10.

For example, the statistical target selection unit 204 may exclude from the selection targets the vehicles 10 which are located in places covered with roofs or the like (for example, inside tunnels, roofed roads, and the like) when the vehicle related information including the environmental state related information for rainfall state estimation is acquired from the vehicles 10. This is because there is a high possibility that the detection information from the rain sensor 14 of the vehicles 10, located in tunnels and the like, does not reflect the rainfall state of the area where the corresponding vehicles 10 are located. At the time, the statistical target selection unit 204 can determine whether or not the vehicles 10 are present in the places covered with roofs or the like, based on, for example, map information for estimation target area held in the center server 20, and on the information on the location of the vehicles 10 included in the vehicle related information.

For example, when the rainfall amount δ as an environmental state value indicative of the rainfall state is calculated using the aforementioned expression (1), the statistical target selection unit 204 may exclude the vehicles 10 during stop, i.e., the vehicles 10 having a vehicle speed v of substantially zero, from the selection targets. This is because there is a high possibility that the effectual rainfall amount δ is not calculable when the vehicle speed v becomes substantially zero on the assumption of using the expression (1).

The environmental state estimation unit 205 calculates an environmental state estimate, for each of the areas, by performing statistical processing for two or more vehicles 10 present in a corresponding area, out of the vehicles 10 selected by the statistical target selection unit 204, the statistical processing relating to environmental state values corresponding to the vehicles 10 calculated by the calculation unit 203. Specifically, the environmental state estimation unit 205 calculates an average of the rainfall amounts δ of the target vehicles 10 as an environmental state value. In short, the average corresponds to an estimate (hereinafter "estimated rainfall amount") δest of the rainfall amount δ of the corresponding area as an environmental state estimate. Accordingly, when the rainfall state is estimated only with the detection information from the rain sensor 14 of one vehicle 10, the estimation accuracy may deteriorate, as the estimation result depends on the detecting accuracy of the rain sensor 14 of the vehicle 10, the vehicle state of the vehicle 10 (for example, being located in a tunnel), or the like. However, by using the detection information from the rain sensor 14 of two or more vehicles 10 which are present in the same area, the rainfall state of the area can be estimated with higher accuracy.

The output information generation unit 206 generates output information (rainfall state output information) indicative of the rainfall state estimated for each of the areas.

Figure 4:
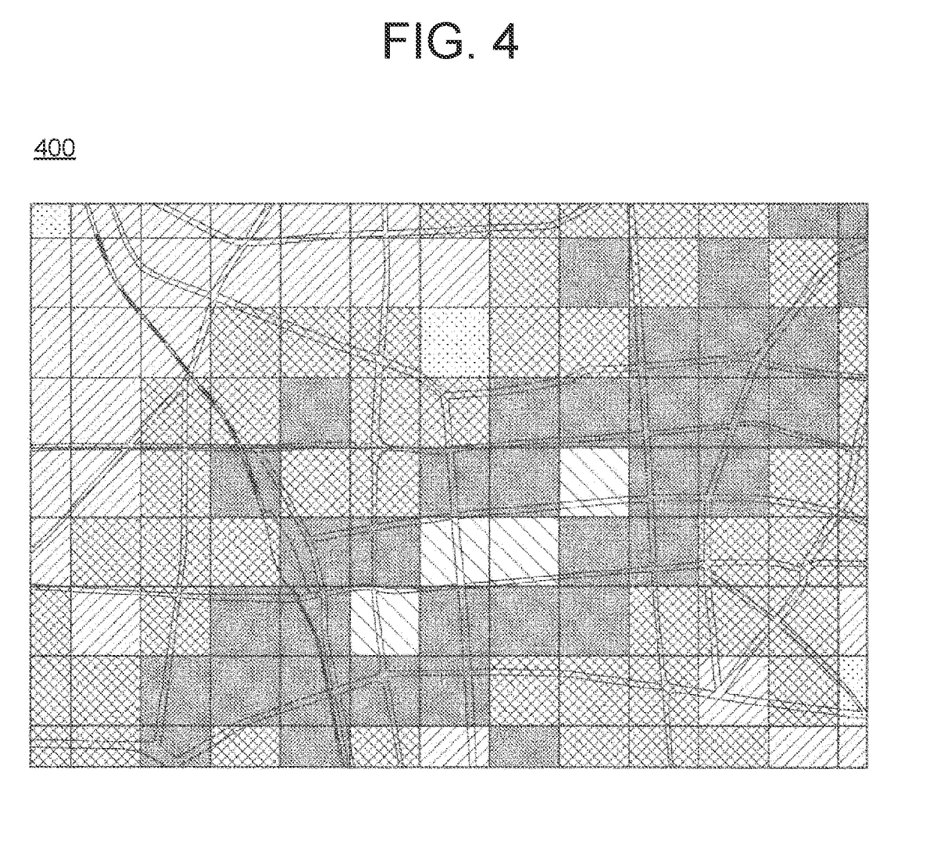
FIG. 4 shows an example of output information regarding an estimated environmental state.

For example, FIG. 4 shows an example of the output information regarding an estimated environmental state.

In the present example, the output information generation unit 206 generates a map (hereinafter "estimated rainfall amount map") 400 relating to the estimated rainfall amount, the map being configured such that square-like grids corresponding to a plurality of areas on the map screen are displayed in colors different in type or density, depending on the rainfall state, that is, the rainfall amount to be specific. Thus, for example, a user of an estimated rainfall amount map 400 can display the generated estimated rainfall amount map 400 on a display device, or the like, which is connected to the display device 26 of the center server 20 or a prescribed external device so as to visibly recognize the rainfall state of each area.

The rainfall state output information generated by the output information generation unit 206 may be used for control of the wiper 18A of the vehicle 10 as described later, for example.

The rainfall state output information may also be provided to, for example, an external device (for example, management server) relating to a company which manages other vehicle groups different from the vehicles 10, or the like, and be used for control of the wipers of other vehicle groups.

The rainfall state output information may be used for control other than the wiper control of the vehicles 10 or other vehicle (groups), or for control relating to services provided to the vehicles 10 or other vehicle (groups), for example.

The rainfall state output information may also be provided to an external device, or the like, relating to a weather company or the like, and be used for weather analysis.

The control information output unit 207 transmits the control information regarding the operation of the wiper 18A to the vehicles 10 in any area, based on the rainfall state, that is, the estimated rainfall amount δest to be specific, of the corresponding area estimated by the environmental state estimation unit 205. Specifically, the control information output unit 207 transmits, to vehicles 10 present in a certain area, control information which defines the presence of operation of the wiper 18A of the vehicles 10, the operating speed at the time of operation of the wiper 18A (i.e., operation period), or the like, based on the estimated rainfall amount δest of the area. The vehicle control unit 112 of the vehicles 10 may control the wiper 18A based on the control information received from the center server 20. Thus, the wiper 18A operates based on the control specifications defined by the control information received from the control information output unit 207. At the time, the vehicle control unit 112 may directly control the wiper 18A, or may indirectly control the wiper 18A by transmitting a control request to another ECU which controls the wiper 18A. This control procedures also apply to the control of the air-conditioner 18B, the navigation device 18C, and the fog lamp 18D performed by the vehicle control unit 112 described later.

For example, when automatic control of the wiper 18A is performed with use of only the detection information from the rain sensor 14 of an own vehicle, a deviation from an actual rainfall amount may become relatively larger depending on the state, accuracy specification, or the like of the rain sensor 14. As a result, a gap between the feeling of a user, such as a driver, (for example, how much rain falls before the user wants to start operation of the wiper, or how much rain falls before the user wants to increase the operating speed, or the like) and an actual operation of the wiper 18A may become relatively large.

As a solution, the rainfall state (estimated rainfall amount δest) estimated by the environmental state estimation unit 205 based on the information from the rain sensor 14 of two or more vehicles 10 in the same area is used, so that the deviation between the feeling of the user and the operation of the wiper 18A can be reduced.

A series of processing performed by the calculation unit 203, the statistical target selection unit 204, the environmental state estimation unit 205, the output information generation unit 206, and the control information output unit 207 is repeatedly executed at a specified control period (for example, one minute to several minutes). This also applies to the processing in a method for flooding state estimation and a method for visibility state estimation described later.

Method for Flooding State Estimation

Description is now given of an example of a method for estimating the flooding state of roads (for example, the presence of flooding, the level of flooding at the time of flooding, the degree of risk of encountering flooded roads in the areas, or the like) by the environmental state estimation system 1.

In the present example, the information transmission unit 111 of the vehicle 10 transmits the vehicle related information to the center server 20 at a specified period. In this case, the vehicle related information to be transmitted includes detection information from the wheel speed sensor 15 (wheel speed sensors 15FL, 15FR, 15RL, 15RR) as the environmental state related information (second environmental state related information to be specific) of the vehicle 10, detection information from the steering angle sensor 16, information on the location of the vehicle 10, and the like. The detection information from the wheel speed sensor 15 (wheel speed sensors 15FL, 15FR, 15RL, 15RR) may be a group of detection information for a latest fixed period of time (for example, for several seconds) instead of the detection information at a certain time point.

The calculation unit 203 of the center server 20 calculates, for each of the vehicles 10 or each of the vehicles 10 selected by the statistical target selection unit 204, an estimate (hereinafter, "travel resistance estimate") of travel resistance applied to the wheel of the vehicle 10 as an environmental state value indicative of the flooding state, based on the detection information from the wheel speed sensor 15 as the latest environmental state related information received in the center server 20, the environmental state related information being stored in the vehicle related information storage unit 202. This is because when a road is flooded, water generates travel resistance that is applied to the wheel of the vehicles 10.

The function of the calculation unit 203 in the present embodiment may be transferred to each of the vehicles 10. In that case, the ECU 11 in each of the vehicles 10 calculates a travel resistance estimate (for example, travel resistance estimate of a driven wheel described later) based on the detection information from the wheel speed sensor 15, and transmits the vehicle related information including the calculated travel resistance estimate to the center server 20.

For example, the calculation unit 203 calculates the travel resistance estimate of the driven wheel based on the detection information from wheel speed sensors 15FL, 15FR, 15RL, 15RR, and the detection information from the steering angle sensor 16.

Specifically, the calculation unit 203 may calculate the travel resistance estimate of the driven wheel based on a difference between a wheel speed (hereinafter "driving wheel wheel speed") V1 of a driving wheel (wheel driven with a driving force source such as an engine) that is one of the front wheel and the rear wheel, and a wheel speed (hereinafter "driven wheel wheel speed") V2 of a driven wheel (wheel rotated in accordance with operation of the driving wheel) that is the other of the front wheel and the rear wheel. This is because the driving wheel can maintain the wheel speed corresponding to the vehicle speed with the drive power of a power source such as an engine even with application of travel resistance, whereas the wheel speed of the driven wheel may become relatively smaller than the wheel speed of the driving wheel with application of the travel resistance caused by flooding. For example, the calculation unit 203 may multiply a deceleration of the driven wheel wheel speed V2 by the moment of inertia of foil of the driven wheel to calculate the travel resistance estimate of the driven wheel. The calculation unit 203 may analyze the difference between the driving wheel wheel speed V1 and the driven wheel wheel speed V2 for every combination of right and left driving wheel and driven wheel (left driving wheel and left driven wheel, right driving wheel and right driven wheel), and calculate the travel resistance estimate of the right and left driven wheels. This is because there is a possibility that only one of the right side and left side of the vehicle 10 is flooded. The calculation unit 203 may also determine whether or not the vehicle 10 is in a turning state based on a steering angle θ corresponding to the detection information from the steering angle sensor 16. When the vehicle 10 is in the turning state, the calculation unit 203 may calculate the travel resistance value in consideration of the difference in wheel speed between the right wheel and the left wheel generated due to the turning state of the vehicle 10.

The statistical target selection unit 204 of the center server 20 selects, out of the vehicles 10, vehicles 10 as the targets of statistical processing performed by the environmental state estimation unit 205 as described before. In other words, the statistical target selection unit 204 may select the vehicles 10 as the targets of the statistical processing performed by the environmental state estimation unit 205 by excluding vehicles 10 unsuitable as the targets of the statistical processing from the vehicles 10.

For example, the statistical target selection unit 204 may exclude vehicles 10 traveling in an all-wheel drive (four-wheel drive) mode from the selection targets, when the vehicle related information including the environmental state related information for estimation of the flooding state is acquired from the vehicles 10. This is because in the case of the all-wheel drive, estimation of travel resistance is difficult because a driven wheel is not present. Here, the vehicles 10 traveling in the all-wheel drive mode include full-time all-wheel-drive vehicles constantly traveling at an all-wheel drive mode, as well as part-time all-wheel-drive vehicles configured to be switchable between a two-wheel-drive mode and the all-wheel drive mode and temporarily being in an all-wheel drive state. In short, the statistical target selection unit 204 may select the vehicles 10 including the driven wheel, as the targets of the statistical processing performed by the environmental state estimation unit 205, when the vehicle related information including the environmental state related information for estimation of the flooding state is acquired.

For example, the statistical target selection unit 204 may exclude vehicles 10 in a turning state from the selection targets, when the vehicle related information including the environmental state related information for estimation of the flooding state is acquired from the vehicles 10. This is because when the vehicle 10 is in a turning state, a difference in wheel speed is generated between the light wheel and the left wheel, and therefore the accuracy of the travel resistance estimate of the driven wheel, calculated from the front and rear driving wheel wheel speed and driven wheel wheel speed, may be deteriorated.

The environmental state estimation unit 205 calculates an environmental state estimate, for each of the areas, by performing statistical processing for two or more vehicles 10 present in a corresponding area, out of the vehicles 10 selected by the statistical target selection unit 204, the statistical processing relating to environmental state values corresponding to the vehicles 10 calculated by the calculation unit 203. Specifically, the environmental state estimation unit 205 calculates, as an environmental state estimate, a cumulative total value (hereinafter "cumulative driven wheel travel resistance value") of the driven wheel travel resistance values as an environmental state value in a specified unit time (for example, for 1 minute) of the target vehicles 10. The environmental state estimation unit 205 may also determine occurrence of a flooding state when the driven wheel travel resistance of the target vehicles 10 is equal to or more than a specified threshold, and may calculate a cumulative total value (hereinafter "cumulative flooding occurrence frequency value") of the frequency (number of times) of occurrence of the flooding state in a specified unit time. Thus, the environmental state estimation unit 205 can estimate, for each of the areas, the presence of flooding, the level of flooding, and the degree of risk of encountering a flooded road, or the like, based on the size of the driven wheel travel resistance value or the cumulative flooding occurrence frequency value. When the flooding state is estimated only with the detection information from the wheel speed sensor 15 of one vehicle 10, the estimation accuracy may deteriorate, as the estimation result depends on the detecting accuracy of the wheel speed sensor 15 of one vehicle, the vehicle state of one vehicle, or the like, for example. However, by using the detection information from the wheel speed sensor 15 of two or more vehicles 10 which are present in the same area, the flooding state of the area can be estimated with higher accuracy.

The output information generation unit 206 generates output information (flooding state output information) indicative of the flooding state estimated for each of the areas.

For example, as in the case of the aforementioned rainfall state, the output information generation unit 206 may output a map (hereinafter "estimated flooding state map") 400 regarding the estimated flooding state as shown in FIG. 4. Specifically, as shown in FIG. 4, the estimated flooding state map 400 may be configured such that square-like grids corresponding to a plurality of areas on the map screen are displayed in colors different in type or density, depending on the level of flooding including the presence of flooding, or the degree of risk of encountering a flooded road. Thus, for example, the user of the estimated flooding state map 400 can visually recognize the flooding state of each area in the same manner as in the case of the aforementioned estimated rainfall amount map 400.

The flooding state output information generated by the output information generation unit 206 may be used for route navigation by the navigation device 18C of the vehicle 10 described later.

The flooding state output information may also be provided to, for example, an external device (for example, management server) relating to a company which manages other vehicle groups different from the vehicles 10, or the like, and be used for route navigation by navigation devices of other vehicle groups.

In the center server 20 or an external device, the flooding state output information may be used together with the aforementioned rainfall state output information for prediction of future progress of the flooding state, or the like.

The flooding state output information may also be provided to external devices relating to road management authorities, organizations, or other entities and be used for road monitoring services (for example, prioritization of road monitoring, or the like).

The control information output unit 207 transmits control information regarding the route navigation to a prescribed destination by the navigation device 18C, based on the rainfall state for each of the areas estimated by the environmental state estimation unit 205. Specifically, based on the flooding state of each of the areas, the control information output unit 207 transmits control information which defines an area, or the like, where traveling of the vehicle 10 is not recommended to the vehicle 10. Based on the control information received from the center server 20, the vehicle control unit 112 of the vehicle 10 performs control of the route navigation by the navigation device 18C. Specifically, the vehicle control unit 112 controls the navigation device 18C to search for a route to the destination that bypasses the area defined in the control information, or to change the set route to a route that bypasses the area defined in the control information. Thus, the vehicle 10 can reduce the risk of encountering the flooding state. For example, when the route search is performed with an external device of the vehicle 10 like the aforementioned navigation server, the control information output unit 207 may transmit the control information to the external device.

Method for Visibility State Estimation

Description is now given of an example of a method for estimating the visibility state (for example, the presence of low visibility where a visually recognizable distance is equal to or less than a specified threshold, the level of low visibility, or the like) by the environmental state estimation system 1.

In the present example, the information transmission unit 111 of the vehicle 10 transmits the vehicle related information to the center server 20 at a specified period, for example. In this case, the vehicle related information to be transmitted includes image information on an image surrounding the vehicle 10 provided by the camera 17 as the environmental state related information for the vehicle 10, or information (hereinafter "image recognition rate information") regarding an image recognition rate in image recognition for recognizing a prescribed object (for example, a vehicle, a person, a building, an indicator, or the like) from the image information, and information on the location of the vehicle 10. When the vehicle related information to be transmitted includes the aforementioned image recognition rate information, the ECU 11 of the vehicle 10 may execute image recognition processing based on, for example, a learned model already subjected to machine learning for recognizing objects of prescribed types from the image information, and may calculate an image recognition rate. At the time, the ECU 11 may include the CPU 11C, as well as a calculation device for image processing for performing high speed calculation processing by parallel processing in conjunction with the CPU 11C. The ECU 11 may also perform image recognition processing in conjunction with another computer including the calculation device for image processing that is mounted on the vehicle 10. This processing procedures may also apply to the case of calculating the image recognition rate in the center server 20 as described later.

When the vehicle related information to be transmitted includes the image information on an image surrounding the vehicle 10 provided by the camera 17, the calculation unit 203 of the center server 20 calculates, for each of the vehicles 10, an image recognition rate as an environmental state value indicative of the visibility state, based on the image information on the image surrounding the vehicle 10 as the latest environmental state related information received in the center server 20, the environmental state related information being stored in the vehicle related information storage unit 202. The image recognition rate may be calculated by the same method as described before.

In the configuration where the image recognition rate information is transmitted from the center server 20, the calculation unit 203 may be omitted. In short, the function of the calculation unit 203 in the present example may be transferred to the vehicles 10, and the vehicles 10 may be configured to directly transmit the image recognition rate information to the center server 20.

The statistical target selection unit 204 of the center server 20 selects, out of the vehicles 10, vehicles 10 as the targets of statistical processing performed by the environmental state estimation unit 205 as described before. In other words, the statistical target selection unit 204 may select the vehicles 10 as the targets of the statistical processing performed by the environmental state estimation unit 205 by excluding vehicles 10 unsuitable as the targets of the statistical processing from the vehicles 10.

For example, the statistical target selection unit 204 may exclude vehicles 10 corresponding to the image information having an image recognition rate that is out of a prescribed normal range, from the vehicles 10 as the targets of statistical processing. In short, the statistical target selection unit 204 may select, out of the vehicles 10, vehicles 10 corresponding to the image information having an image recognition rate within the prescribed normal range as the targets of statistical processing. In this case, the normal range may be defined in advance as a relatively high range that is high enough to exclude very low image recognition rates corresponding to, for example, the image information that shows nothing about the surrounding of the vehicle 10 due to frost, dew, or the like, on the front window of the vehicle 10. The normal range may dynamically be defined (calculated), for each of the areas, as a relatively high range including an average of the image recognition rates of the vehicles 10 which are present in a corresponding area, when the vehicle related information including the environmental state related information for estimation of the visibility state is acquired, for example. Thus, it is possible to exclude vehicles 10, having frost, dew, or the like, formed on the front window and so the image information from the camera 17 does not reflect the surrounding visibility state, from the targets of statistical processing.

In the case where the camera 17 is attached outside the vehicle cabin, the statistical target selection unit 204 may also exclude the vehicles 10 corresponding to the image information having an image recognition rate that is out of the prescribed normal range, from the targets of the statistical processing in the same manner as described above. This is because when the camera 17 is attached outside the vehicle cabin, the lens of the camera 17 may have raindrops, frost, dew, or the like formed thereon.

The environmental state estimation unit 205 calculates an environmental state estimate, for each of the areas, by performing statistical processing for two or more vehicles 10, out of the vehicles 10 selected by the statistical target selection unit 204, present in a corresponding area, the statistical processing relating to environmental state values corresponding to the vehicles 10, the environmental state values being calculated by the calculation unit 203. Specifically, the environmental state estimation unit 205 calculates an average (hereinafter "average image recognition rate") of the image recognition rates of the target vehicles, as an environmental state estimate. Thus, the environmental state estimation unit 205 can estimate the visibility state depending on high-low of the average image recognition rate in such a way that, as the average image recognition rate becomes higher, the visibility state is better, while as the average image recognition rate becomes lower, the visibility state is worse, and when an average image recognition rate becomes equal to or less than a specified threshold, the area is in a low visibility state.

The environmental state estimation unit 205 may predict a future visibility state for each of the areas, based on other weather information, such as information regarding wind speed and wind direction.

The output information generation unit 206 generates output information (visibility state output information) indicative of the visibility state estimated for each of the areas.

For example, as in the case of the aforementioned rainfall state and the flooding state, the output information generation unit 206 may output a map (hereinafter "visibility state map") 400 relating to the estimated visibility state as shown in FIG. 4. Specifically, as shown in FIG. 4, the visibility state map 400 may be configured such that square-like grids corresponding to a plurality of areas on the map screen are displayed in colors different in type or density, depending on a visibility class indicative of the visibility state, or the degree of low visibility including the presence of low visibility. Thus, for example, the user of the estimated visibility state map 400 can visually recognize the visibility state of each area in the same manner as in the case of the aforementioned estimated rainfall amount map 400 and the estimated flooding state map 400.

The visibility state output information generated by the output information generation unit 206 may be used for control of the air-conditioner 18B or the fog lamp 18D as described later.

The visibility state output information may also be provided to, for example, an external device, or the like, relating to a weather company or the like, and be used for weather analysis.

The control information output unit 207 transmits control information regarding the fog lamp 18D to the vehicles 10 in an area, out of the areas, determined to have low visibility, based on the visibility state of each area estimated by the environmental state estimation unit 205. Specifically, the control information output unit 207 transmits control information that requests the vehicles 10 to light the fog lamp. When the fog lamp 18D is not in a turned-on state, the vehicle control unit 112 of the vehicles 10 may automatically turn on the fog lamp 18D based on the control information received from the center server 20. Thus, even in the case where the drivers of the vehicles 10 forget to light the fog lamp 18D in the low visibility state, the fog lamp 18D can automatically be turned on based on the control information from the center server 20.

The control information output unit 207 identifies the vehicles 10 having frost, fog, or the like on the front window, based on the visibility state of each area estimated by the environmental state estimation unit 205, and performs control of the air-conditioner 18B for the identified vehicles 10. Specifically, in the case where a vehicle 10 is located in the area where the visibility state is estimated to be relatively good by the environmental state estimation unit 205, though the image information from the camera 17 has an image recognition rate that is out of the aforementioned normal range, the control information output unit 207 determines that the vehicle 10 corresponding to the image information from the camera 17 has frost, fog, or the like, formed on the front window, or the like. The control information output unit 207 transmits to the identified vehicle 10 control information that requests operation start (ON) of the air-conditioner 18B, operation (ON) of the defogger function of the air-conditioner 18B, or the like. Based on the control information received from the center server 20, the vehicle control unit 112 of the vehicle 10 may perform control of the air-conditioner 18B. Thus, even in the case where the vehicle 10 has frost or fog on the front window, or the like, the frost or fog can be removed by automatically starting operation of the air-conditioner 18B or actively operating the defogger function.

Behavior

Description is now given of the behavior of the environmental state estimation system 1 (center server 20) according to the present embodiment.

In the present embodiment, the center server 20 includes the environmental state estimation unit 205 which estimates the environmental state of a prescribed area, based on information (environmental state related information) regarding the environmental state surrounding the vehicles 10 in the prescribed area acquired by the vehicles 10.

Accordingly, since the information regarding the environmental state acquired by the vehicles 10 in the same area is used, factors for accuracy deterioration, such as abnormal values, can be removed from the information corresponding to the vehicles 10, and the abnormal values, or the like, may be equalized with the information corresponding to the vehicles 10. Hence, the center server 20 can estimate the environmental state of the prescribed area with higher accuracy.

In the present embodiment, the environmental state estimation unit 205 may perform at least one of: estimating the rainfall state of the prescribed area, based on detection information from the rain sensor 14 in each of the vehicles 10; estimating the flooding state of the prescribed area, based on information on wheel speed of driving wheel and driven wheel in each of the vehicles 10; and estimating the visibility state of the prescribed area, based on a surrounding image picked up by the camera 17 in each of the vehicles 10.

Thus, the center server 20 can specifically estimate at least one of the rainfall state, the flooding state, and the visibility state of a prescribed area, based on detection information from the rain sensor 14 acquired in the vehicles 10, wheel speed information on the driving wheel and driven wheel of the vehicles 10 from the wheel speed sensor 15, and picked up images surrounding the vehicles 10 (image information from the camera 17) to be specific.

In the present embodiment, the environmental state estimation unit 205 may estimate the environmental state of a prescribed area, by performing statistical processing of some or all of the vehicles 10, the statistical processing relating to the first numerical values (environmental state values) indicative of the environmental state surrounding the vehicles 10, the first numerical values being calculated based on the information regarding the environmental state surrounding the vehicles 10.

Thus, the center server 20 can perform the statistical processing relating to the first numerical values calculated based on the information regarding the environmental state surrounding the vehicles 10. Specifically, the center server 20 can estimate the environmental state.

In the present embodiment, the center server 20 may include the calculation unit 203 configured to calculate the first numerical values indicative of the environmental state surrounding the vehicles 10, based on the information regarding the environmental state surrounding the vehicles 10.

Thus, the center server 20 can autonomously calculate the first numerical values indicative of the environmental state surrounding the vehicles 10, based on the information regarding the environmental state surrounding the vehicles 10. This eliminates the necessity of performing, on the vehicle 10 side, the processing of calculating the first numerical values indicative of the environmental state surrounding the vehicles 10 based on the information regarding the environmental state surrounding the vehicles 10 such as detection information from the sensors. As a result, the center server 20 can reduce processing load on the vehicle 10 side.

In the present embodiment, the center server 20 may also include the statistical target selection unit 204 configured to select, out of the vehicles 10, vehicles 10 in a prescribed vehicle state, when the information regarding the environmental state surrounding the vehicles 10 is acquired. Then, the environmental state estimation unit 205 may perform statistical processing for the vehicles 10 selected by the statistical target selection unit 204.

Hence, the center server 20 can exclude, for example, vehicles 10 which have a possibility of acquiring the information regarding the environmental state with low accuracy, from the vehicles 10, and select only the vehicles 10 which can acquire the information regarding the environmental state having a certain level of accuracy. Therefore, the center server 20 can estimate the environmental state of the prescribed area with further higher accuracy.

In the present embodiment, the statistical target selection unit 204 may select, out of the vehicles 10, vehicles 10 not located in roofed places including tunnels, when the information regarding the environmental state surrounding the vehicles 10 is acquired. Then, the environmental state estimation unit 205 may estimate the rainfall state of the prescribed area by performing the statistical processing for the vehicles 10 selected by the statistical target selection unit 204, the statistical processing relating to second numerical values (rainfall amounts δ) indicative of the rainfall state surrounding the vehicles 10, the second numerical values being calculated based on the detection information from the rain sensor 14 of the vehicles 10.

Since the detection information from the rain sensor 14 acquired in the vehicles 10 located inside tunnels or other roofed places cannot reflect the rainfall state of the area at all, the center server 20 can select only the vehicles 10 not located inside tunnels and the like, as the targets of the statistical processing for estimation of the rainfall state. Therefore, the center server 20 can estimate the rainfall state of the prescribed area with further higher accuracy.

In the present embodiment, the statistical target selection unit 204 may select vehicles 10 including a driven wheel from the vehicles 10. Then, the environmental state estimation unit 205 may estimate the flooding state of a prescribed area by performing the statistical processing for the vehicles 10 selected by the statistical target selection unit 204, the statistical processing relating to third numerical values (travel resistance estimates) corresponding to travel resistance of the driven wheel of the vehicles 10, the third numerical values being calculated based on the information on the wheel speed of the driving wheel and the driven wheel of the vehicles 10.

Thus, the center server 20 can estimate the flooding state of the prescribed area based on the travel resistance corresponding to a difference in wheel speed between the driving wheel and the driven wheel, for example. Hence, the center server 20 can exclude vehicles 10 traveling with four-wheel drive (for example, part time four-wheel drive vehicles traveling with the four-wheel drive that is automatically or manually selected, or full time four-wheel drive vehicles traveling with permanent four-wheel drive) from the targets of the statistical processing. Therefore, the center server 20 can estimate the flooding state of the prescribed area more appropriately.

In the present embodiment, the statistical target selection unit 204 may select, from the vehicles 10, vehicles 10 having an image recognition rate within a prescribed normal range in image recognition for recognizing a prescribed object from surrounding images picked up by the camera 17 of the vehicles 10. Then, the environmental state estimation unit 205 may estimate the visibility state of a prescribed area by performing the statistical processing for the vehicles 10 selected by the statistical target selection unit 204, the statistical processing relating to the image recognition rate as the numerical value.

Thus, the center server 20 can estimate the visibility state of the prescribed area based on the image recognition rate for the images surrounding the vehicles 10 picked up by the cameras 17. Hence, the center server 20 can exclude the vehicles 10 having an image recognition rate not in the prescribed normal range, from the targets of the statistical processing. Therefore, the center server 20 can estimate the visibility state of the prescribed area with further higher accuracy.

In the present embodiment, the normal range may be defined as a range relatively lower than an average of the image recognition rates for the vehicles 10.

Hence, for example, in an area where visibility is good to some extent, the image recognition rate for images surrounding the vehicles 10 picked up by the cameras 17 can relatively be high. However, when a certain vehicle 10 has frost, dew, or the like, formed on the front window or the like, or the lens of the camera 17, the frost, dew, or the like, may be included in a picked up image in the vehicle 10. As a result, the image recognition rate of the vehicle may become relatively low. Even in such a case, the center server 20 can specifically exclude such a vehicle 10 from the targets of the statistical processing.

Although the modes for carrying out the present disclosure have been described in detail, an applicable embodiment of the present disclosure is not limited to such specific embodiments. Various modifications and reformations may be made without departing from the scope of the present disclosure.

For example, in the aforementioned embodiments, the center server 20 (environmental state estimation unit 205) may estimate the environmental state of only one or some of the areas.

In the aforementioned embodiments and modifications, the function of the control information output unit 207 in the center server 20 may be transferred to each of the vehicles 10 (for example, ECU 11). In that case, the center server 20 transmits to each of the vehicles 10 the information regarding the environmental state of a corresponding area where the vehicles 10 are located, the information being estimated by the environmental state estimation unit 205. Thus, for example, the ECU 11 of an own vehicle 10 can implement the function of the control information output unit 207, based on the information received from the center server 20, the information regarding the environmental state of the area where the own vehicle is located.

In the aforementioned embodiments and modifications, instead of the center server 20, each of the vehicles 10 (examples of the environmental state estimation device) may estimate the environmental state. For example, the ECU 11 of an own vehicle 10 acquires surrounding environmental state related information (for example, detection information from the rain sensor 14 and the wheel speed sensor 15) acquired by the vehicles 10 in an area, out of the areas, where the own vehicle is located, i.e., acquired by other vehicles 10 around the own vehicle. The ECU 11 of the own vehicle 10 may also acquire environmental state values (for example, image recognition rates regarding the images picked up by the camera 17) calculated based on the surrounding environmental state related information. At the time, the own vehicle 10 may acquire the environmental state related information and the environmental state values from other vehicles 10 via the center server 20, or may acquire the environmental state related information and the environmental state values from other vehicles 10 through a vehicle-to-vehicle communication, or the like. The ECU 11 of the vehicle 10 may also estimate the state of the area where the own vehicle is located by the method as described above, based on the acquired information or numerical values.

What is claimed is:

1. An environmental state estimation device, comprising:
circuitry configured to:
estimate an environmental state of a prescribed area based on information regarding a surrounding environmental state acquired by a plurality of vehicles in the prescribed area including at least one of:
estimating a rainfall state of the prescribed area based on detection information from a rain sensor in each of the vehicles,
estimating a flooding state of the prescribed area based on information on wheel speed of a driving wheel and a driven wheel in each of the vehicles, and
estimating a visibility state of the prescribed area based on a surrounding image picked up by an imaging device in each of the vehicles;
estimate the environmental state of the prescribed area by performing statistical processing for some or all of the vehicles, the statistical processing relating to first numerical values indicative of the environmental state surrounding the vehicles and the first numerical values being calculated based on the information regarding the environmental state surrounding the vehicles;
select, out of the vehicles, vehicles in a prescribed vehicle state when the information regarding the environmental state surrounding the vehicles is acquired; and
perform the statistical processing for the selected vehicles.

2. The environmental state estimation device according to claim 1, wherein the circuitry is configured to calculate the first numerical values indicative of the environmental state surrounding the vehicles based on the information regarding the environmental state surrounding the vehicles.

3. The environmental state estimation device according to claim 1, wherein the circuitry is configured to:
select, out of the vehicles, vehicles not located in roofed places including tunnels when the information regarding the environmental state surrounding the vehicles is acquired; and
estimate the rainfall state of the prescribed area by performing the statistical processing for the selected vehicles, the statistical processing relating to second numerical values indicative of the rainfall state surrounding the vehicles and the second numerical values being calculated based on the detection information from the rain sensor of the vehicles.

4. The environmental state estimation device according to claim 1, wherein the circuitry is configured to:
select, out of the vehicles, vehicles having a driven wheel; and
estimate the flooding state of the prescribed area by performing the statistical processing for the selected vehicles, the statistical processing relating to third numerical values corresponding to travel resistance of the driven wheel of the vehicles and the third numerical values being calculated based on the information on the wheel speed of the driving wheel and the driven wheel of the vehicles.

5. The environmental state estimation device according to claim 1, wherein the circuitry is configured to:
select, out of the vehicles, vehicle corresponding to picked up images having image recognition rates within a prescribed normal range in image recognition for recognizing a prescribed object from the surrounding images picked up by the imaging device of the vehicles; and
estimate the visibility state of the prescribed area by performing the statistical processing for the selected vehicles, the statistical processing relating to the image recognition rates as fourth numerical values.

6. The environmental state estimation device according to claim 5, wherein the prescribed normal range is defined as a relatively high range including an average of the image recognition rates for the vehicles.

7. A method for environmental state estimation executed by an environmental state estimation device, comprising:
estimating an environmental state of a prescribed area based on information regarding a surrounding environmental state acquired by a plurality of vehicles in the prescribed area including at least one of:
estimating a rainfall state of the prescribed area based on detection information from a rain sensor in each of the vehicles,
estimating a flooding state of the prescribed area based on information on wheel speed of a driving wheel and a driven wheel in each of the vehicles, and estimating a visibility state of the prescribed area based on a surrounding image picked up by an imaging device in each of the vehicles;

estimating the environmental state of the prescribed area by performing statistical processing for some or all of the vehicles, the statistical processing relating to first numerical values indicative of the environmental state surrounding the vehicles and the first numerical values being calculated based on the information regarding the environmental state surrounding the vehicles;

selecting, out of the vehicles, vehicles in a prescribed vehicle state when the information regarding the environmental state surrounding the vehicles is acquired; and performing the statistical processing for the selected vehicles.

8. A non-transitory computer readable medium storing an environmental state estimation program which when executed causes a computer to execute:

estimating an environmental state of a prescribed area based on information regarding a surrounding environmental state acquired by a plurality of vehicles in the prescribed area including at least one of:

estimating a rainfall state of the prescribed area based on detection information from a rain sensor in each of the vehicles, estimating a flooding state of the prescribed area based on information on wheel speed of a driving wheel and a driven wheel in each of the vehicles, and estimating a visibility state of the prescribed area based on a surrounding image picked up by an imaging device in each of the vehicles;

estimating the environmental state of the prescribed area by performing statistical processing for some or all of the vehicles, the statistical processing relating to first numerical values indicative of the environmental state surrounding the vehicles and the first numerical values being calculated based on the information regarding the environmental state surrounding the vehicles;

selecting, out of the vehicles, vehicles in a prescribed vehicle state when the information regarding the environmental state surrounding the vehicles is acquired; and performing the statistical processing for the selected vehicles.

* * * * *